United States Patent
Oba et al.

(10) Patent No.: US 12,427,676 B2
(45) Date of Patent: Sep. 30, 2025

(54) ROBOT-MOUNTED MOBILE DEVICE AND POSITIONING CONTROL METHOD FOR SYSTEM

(71) Applicant: DMG MORI CO., LTD., Nara (JP)

(72) Inventors: Yuta Oba, Nara (JP); Yorihito Koda, Nara (JP)

(73) Assignee: DMG MORI CO., LTD., Nara (JP)

( * ) Notice: Subject to any disclaimer, the term of this patent is extended or adjusted under 35 U.S.C. 154(b) by 223 days.

(21) Appl. No.: 18/035,689

(22) PCT Filed: Oct. 26, 2021

(86) PCT No.: PCT/JP2021/039470
§ 371 (c)(1),
(2) Date: May 5, 2023

(87) PCT Pub. No.: WO2022/097536
PCT Pub. Date: May 12, 2022

(65) Prior Publication Data
US 2023/0415353 A1     Dec. 28, 2023

(30) Foreign Application Priority Data
Nov. 5, 2020  (JP) ................. 2020-185030

(51) Int. Cl.
*G06F 17/00*     (2019.01)
*B25J 5/00*      (2006.01)
(Continued)

(52) U.S. Cl.
CPC ............... *B25J 13/087* (2013.01); *B25J 5/00* (2013.01); *B25J 19/021* (2013.01)

(58) Field of Classification Search
CPC . B25J 13/087; B25J 5/00; B25J 19/021; B25J 9/162; B25J 9/1697; B25J 19/023;
(Continued)

(56) References Cited

U.S. PATENT DOCUMENTS

| | | | |
|---|---|---|---|
| 2018/0093380 A1 | 4/2018 | Yoshida et al. | |
| 2022/0134577 A1* | 5/2022 | Oba ................. | B25J 9/1697 700/245 |

(Continued)

FOREIGN PATENT DOCUMENTS

| | | | |
|---|---|---|---|
| JP | H10240323 A | 9/1998 | |
| JP | 2010162635 A | 7/2010 | |

(Continued)

OTHER PUBLICATIONS

Substantial capabilities of robotics in enhancing industry 4.0 implementation (Year: 2021).*

(Continued)

*Primary Examiner* — Ronnie M Mancho
(74) *Attorney, Agent, or Firm* — von Briesen & Roper, s.c.

(57) ABSTRACT

Based on a second identification position as a position of an identification figure when an image of the identification figure is captured by a camera (31) at a second device position different from a first device position, when the second identification position is within a predetermined range from the second device position, the position of a hand unit (29) is adjusted, and when the second identification position is out of the predetermined range from the second device position, the position of a moving unit (35) is adjusted by moving the moving unit (35).

4 Claims, 14 Drawing Sheets

(51) Int. Cl.
*B25J 13/08* (2006.01)
*B25J 19/02* (2006.01)

(58) Field of Classification Search
CPC .......... G05B 2219/37097; G05B 2219/39057; G05B 2219/40298; G05B 2219/40613; G05B 19/41825; B23Q 7/046; B23Q 17/249
USPC ........................................................ 700/259
See application file for complete search history.

(56) References Cited

U.S. PATENT DOCUMENTS

| | | | |
|---|---|---|---|
| 2022/0314455 A1* | 10/2022 | Nagasue | B23Q 17/249 |
| 2022/0331970 A1* | 10/2022 | Oba | B25J 9/163 |
| 2023/0367326 A1* | 11/2023 | Nagasue | B25J 5/007 |
| 2023/0390924 A1* | 12/2023 | Oba | B25J 9/163 |
| 2023/0415353 A1* | 12/2023 | Oba | B25J 13/087 |

FOREIGN PATENT DOCUMENTS

| | | |
|---|---|---|
| JP | 2012011531 A | 1/2012 |
| JP | 2016221622 A | 12/2016 |
| JP | 2017074631 A | 4/2017 |
| JP | 2017132002 A | 8/2017 |
| JP | 2020078852 A | 5/2020 |
| WO | 2016103303 A1 | 6/2016 |

OTHER PUBLICATIONS

International Search Report for related Application No. PCT/JP2021/039470; report dated Jan. 18, 2022.

Extended European Search Report related to application No. 21889089.5; reported on Jan. 3, 2025.

* cited by examiner

ROBOT-MOUNTED MOBILE DEVICE AND POSITIONING CONTROL METHOD FOR SYSTEM

TECHNICAL FIELD

The present disclosure relates to a robot-mounted mobile device that includes a robot having a hand unit acting on a target object and a moving unit moving to a predetermined operation position with the robot mounted thereon, and relates to a positioning control method for a system using the robot-mounted mobile device.

BACKGROUND ART

A known example of the system as mentioned above is disclosed in Japanese Unexamined Patent Application Publication No. 2017-132002 (Patent Literature 1). This system is configured such that an automatic guided vehicle having a robot mounted thereon moves to an operation position set with respect to a machine tool and the robot performs operations, such as attachment and removal of a workpiece, with respect to the machine tool at the operation position.

Such a system enables a single robot which is moved by an automatic guided vehicle to perform operations, such as attachment and removal of a workpiece, with respect to more than one machine tool. Therefore, as compared with a system in which a robot is arranged in a fixed manner with respect to a machine tool, the degree of freedom in machine tool layout is increased so that a machine tool layout which provides enhanced production efficiency is possible. Further, since it is possible to cause a single robot to perform operations with respect to many machine tools, the equipment cost is reduced as compared with the conventional system in which the robot is arranged in a fixed manner.

However, because the automatic guided vehicle is configured to move itself by means of wheels, the automatic guided vehicle cannot always be stopped at the operation position with high positioning accuracy.

Japanese Unexamined Patent Application Publication No. 2016-221622 (Patent Literature 2) discloses a position compensation method that is a known technique for compensating an operating pose of the robot arranged in a fixed manner. Specifically, this position compensation method is configured such that a visual target consisting of two calibration markers is arranged on an outer surface of the machine tool, images of the visual target are captured by a camera arranged on a movable part of the robot, a relative positional relation between the robot and the machine tool is measured based on the captured images and the position and pose of the camera, and the operating pose of the robot is compensated based on the measured positional relation.

In the case where the robot is composed of an articulated robot, the position of an acting part (end effector) arranged on the distal end of the robot arm is defined by accumulation of the postures of the arms that are moved by rotation of the motors forming the arm joints. Each motor is rotatable only within a limited angular range because of its structure. Therefore, depending on the postures of the arms, the acting part cannot be moved any further in a certain direction. That is to say, the robot has singularities. For example, when the arms are positioned in a straight line, the acting part cannot be moved in the extending direction. Further, when two or more movable axes are positioned in a straight line, the acting part cannot be moved in some directions.

Accordingly, compensation of the operating pose into which the robot is brought when the automatic guided vehicle is positioned at the operation position in an automatic operation is impossible if the amount of positioning error of the automatic guided vehicle exceeds the movable range of the acting part that is limited by the singularities. Consequently, the system is brought into an alarm state and shut down.

This is more specifically described on the basis of FIGS. 10 and 11. In FIGS. 10 and 11, the automatic guided vehicle is to be moved in an X-axis and Y-axis plane. Pt indicates a taught position (target position) of the distal end of the acting part of the robot (robot end) on a plane parallel to the X-axis and Y-axis plane, which is set with the automatic guided vehicle positioned at the operation position in a teaching operation. Pa indicates the position (actual operating position) of the robot end on the plane parallel to the X-axis and Y-axis plane with the automatic guided vehicle positioned at the operation position in an automatic operation. Further, $\Delta Xe$, $\Delta Ye$ indicate positioning error amounts of the automatic guided vehicle, and $Xc$, $Yc$ respectively indicate movable distances in the X-axis direction and the Y-axis direction of the robot end with respect to the actual operating position Pa.

For example, as shown in FIG. 10, when both of the positioning error amounts $\Delta Xe$, $\Delta Ye$ of the automatic guided vehicle are smaller than the movable distances $Xc$, $Yc$ in the X-axis direction and the Y-axis direction of the robot end with respect to the actual operating position Pa, i.e., when the target position Pt as a position to which the robot end has to be moved by compensation is situated within the movable area of the robot end that is indicated by the dashed and double-dotted lines, the actual operating position Pa of the robot end can be compensated to the target position Pt (refer to the broken-line arrow).

On the other hand, as shown in FIG. 11, when at least one of the positioning error amounts $\Delta Xe$, $\Delta Ye$ of the automatic guided vehicle exceeds a corresponding one of the movable distances $Xc$, $Yc$ in the X-axis direction and the Y-axis direction of the robot end with respect to the actual operating position Pa (FIG. 11 shows the case of $\Delta Xe > Xc$), i.e., when the target position Pt as a position to which the robot end has to be moved by compensation is situated out of the movable area of the robot end that is indicated by the dashed and double-dotted lines, the actual operating position Pa of the robot end cannot be compensated to the target position Pt (refer to the broken-line arrow).

CITATION LIST

Patent Literature

Patent Literature 1: Japanese Unexamined Patent Application Publication No. 2017-132002
Patent Literature 2: Japanese Unexamined Patent Application Publication No. 2016-221622

SUMMARY OF INVENTION

Technical Problem

When the system has been brought into the alarm state and shut down because of being unable to carry out the compensation, it is necessary to return the moving unit and the robot to their respective initial positions before resuming the system. Further, if the system is frequently brought into the alarm state, it is necessary to take measures such as resetting the position of the robot and the moving position of the moving unit by the teaching operation. Taking such measures reduces the availability of the system.

Therefore, it is desired to improve the accuracy of the position of the robot that performs operations acting on a target object in the machine tool.

Solution to Problem

In view of the foregoing, the present invention provides a robot-mounted mobile device and a positioning control method for system as set forth in the appended claims.

Advantageous Effects of Invention

The present invention improves the accuracy of the position of a robot performing an operation acting on a target object in a machine tool.

DESCRIPTION OF EMBODIMENTS

Hereinafter, specific embodiments of the present invention will be described with reference to the drawings.

Embodiment 1

Figure 1:
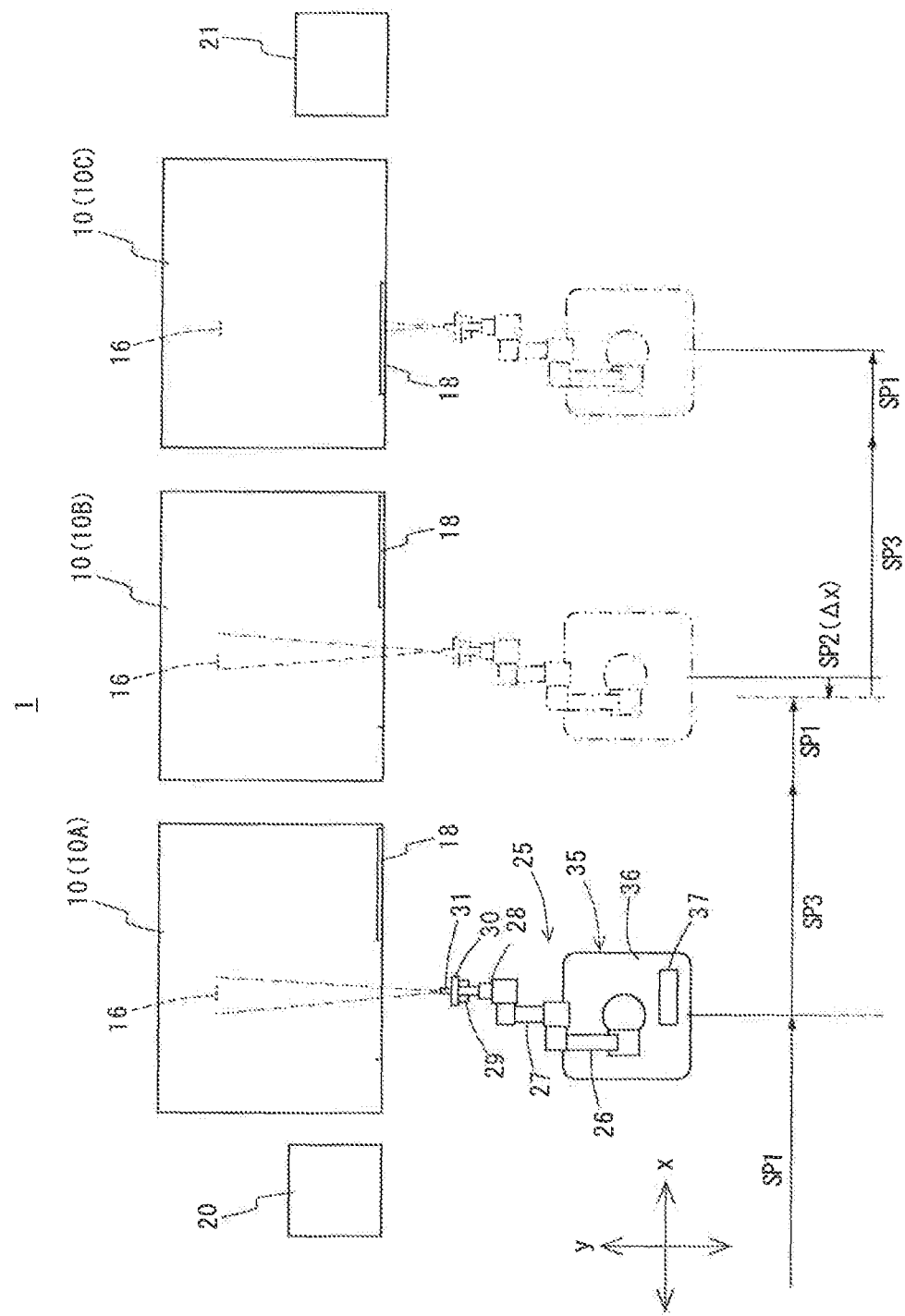
FIG. 1 is a plan view schematically illustrating a structure of a system according to an embodiment.
Figure 2:
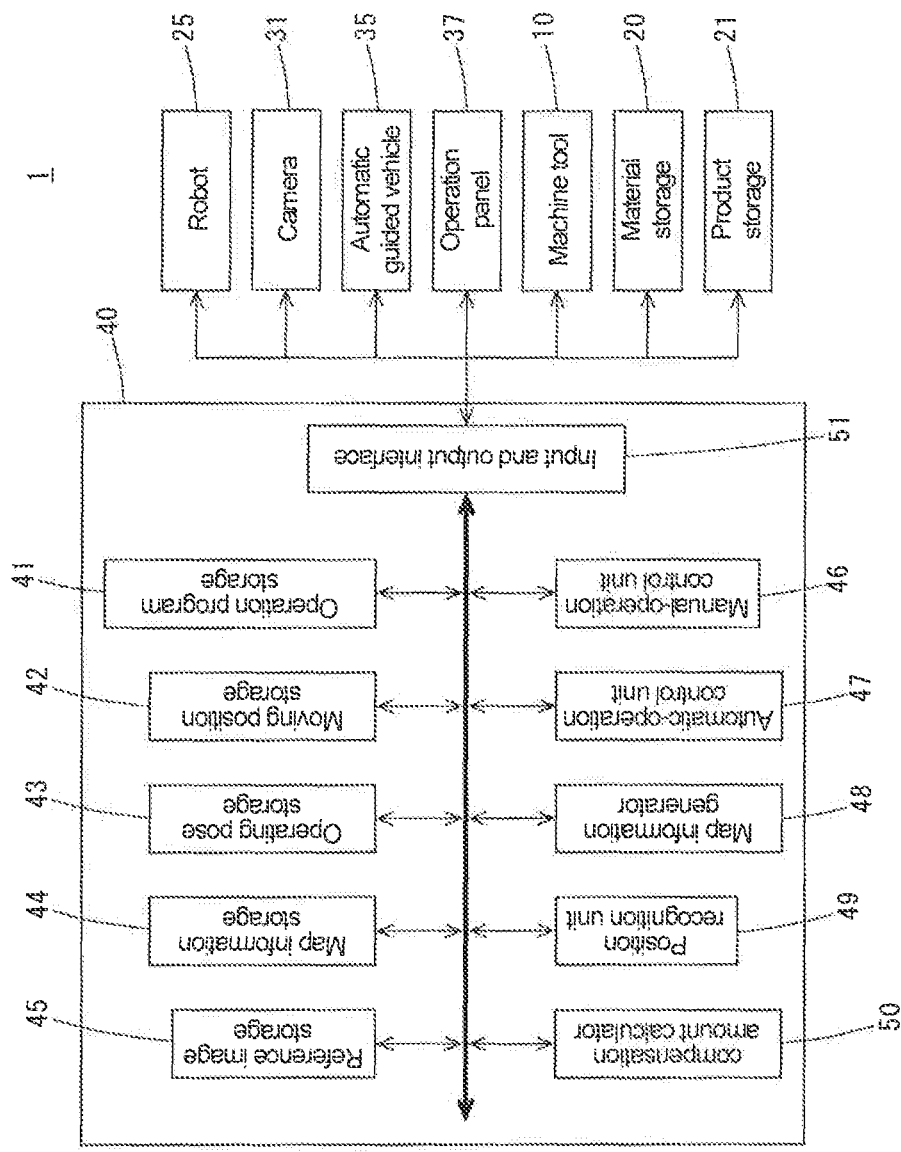
FIG. 2 is a block diagram illustrating a configuration of the system according to the embodiment.

As illustrated in FIGS. 1 and 2, a system 1 according to this embodiment includes a first machine tool 10A, a second machine tool 10B, a third machine tool 10C, a material storage 20 and a product storage 21 as peripheral devices, an automatic guided vehicle (AGV) 35 as an example of the moving unit, a robot 25 mounted on the automatic guided vehicle 35, a camera 31 attached to the robot 25, and a controller 40 controlling a hand unit of the robot 25 and the automatic guided vehicle 35. The first machine tool 10A, the second machine tool 10B, and the third machine tool 10C (hereinafter, sometimes collectively referred to as "machine tool 10") have the same configuration.

Note that the automatic guided vehicle 35, the robot 25, the camera 31, and the controller 40 constitute the robot-mounted mobile device in this embodiment; however, the robot-mounted mobile device is not limited to these components. The robot-mounted mobile device in this embodiment only needs to include at least a camera, a robot, a control unit controlling the position of a hand unit of the robot, and a movable moving unit.

Figure 4:
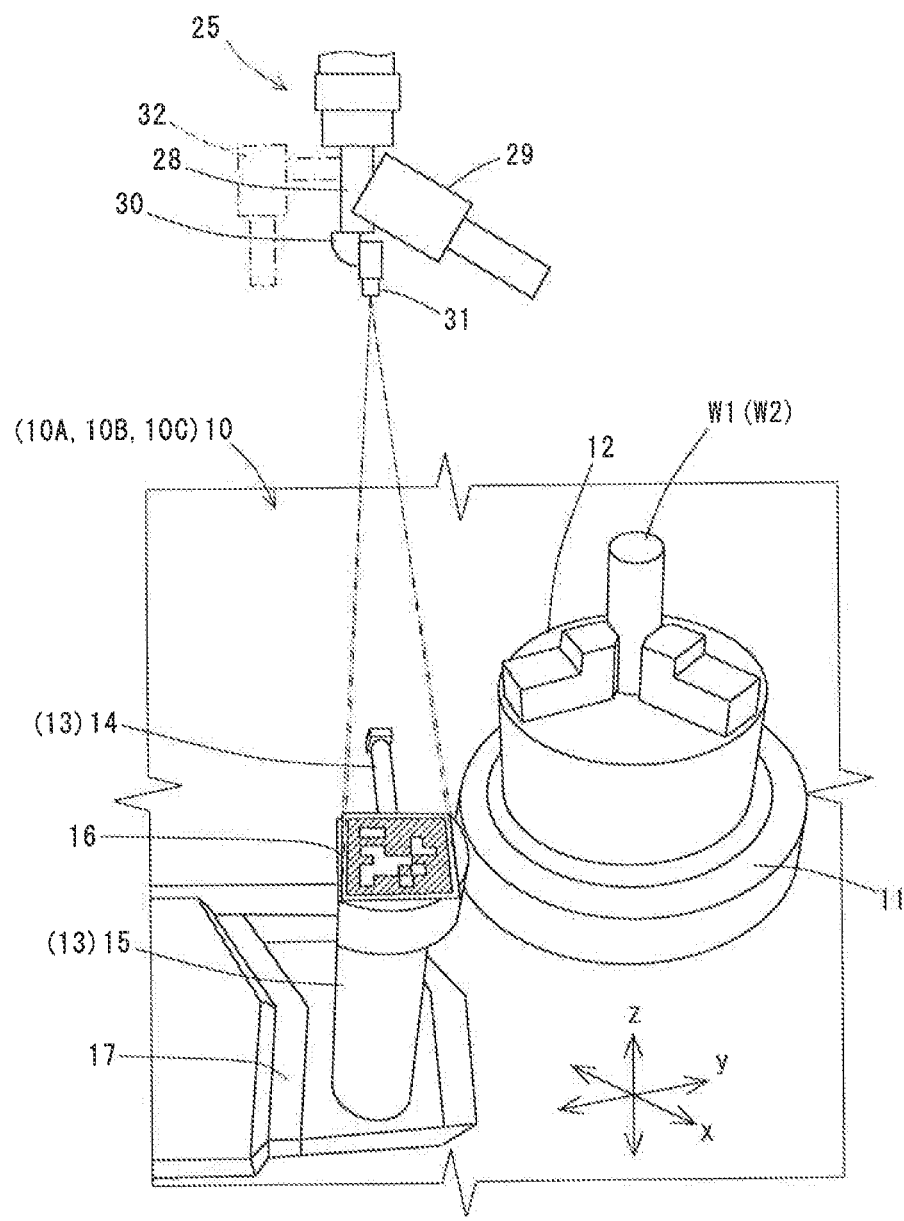
FIG. 4 is an illustrative diagram regarding an image capturing pose of the robot in the embodiment.
Figure 5:
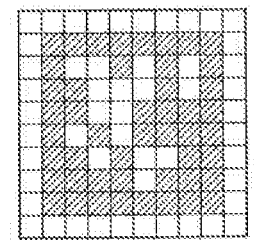
FIG. 5 is an illustrative diagram of an identification figure in the embodiment.

As illustrated in FIG. 4, the machine tool 10 is a typical NC (numerically-controlled) horizontal lathe that has a spindle 11, to which a chuck 12 for clamping a workpiece W1 (W2) is attached, and performs turning on the workpiece W1 (W2). The machine tool 10 has a tool presetter 13 arranged in the vicinity of the spindle 11. The tool presetter 13 has a contactor 14 and a support bar 15 supporting the contactor 14. The support bar 15 is movable into and out of a machining area along an axis of the spindle 11 and has a display board 16, which is made of ceramics, arranged on an end surface thereof located on the machining area side. The display board 16 has an identification figure, as illustrated in FIG. 5, drawn thereon.

The identification figure is preferably imaged by the camera 31 when positioned within the machining area of the machine tool 10. Therefore, coolant, machining chips, and the like can adhere to the identification figure. These foreign objects such as coolant adhering to the identification figure may make it impossible to recognize the position of the identification figure based on image data including the identification figure. Accordingly, a cleaning means 32 (indicated by the dashed and dotted line in FIG. 4), e.g., an air blow or a rubber brush, may be provided on the robot 25 to clean the display board 16 including the identification figure. Alternatively, a cleaning means may be provided in the machine tool 10 instead of the provision of the cleaning means 32 on the robot 25. For example, a vibration generating means, for example, an ultrasonic vibration generating means including a piezoelectric element, may be provided on the back of the display board 16 to vibrate the display board 16 including the identification figure so that foreign objects adhering to the surfaces of the display board 16 and identification figure are shaken off.

The display board 16 in this embodiment is arranged horizontally; therefore, the identification figure is parallel to a horizontal plane. FIG. 4 shows a state where the support bar 15 and the contactor 14 have been moved into the machining area. After the support bar 15 and the contactor 14 are moved out of the machining area so that the contactor 14 and the display board 16 are retracted into a storage area, a shutter 17 is closed so that the contactor 14 and the display board 16 are isolated from the machining area. Note that the display board 16 may be arranged parallel to a vertical plane. An example of such an arrangement, in which the display board 16 is arranged to be positioned in front of the robot 25, is indicated by broken lines in FIG. 1.

The identification figure in this example has a matrix structure having a plurality of square pixels arranged two-dimensionally, and each pixel is displayed in white or black.

In FIG. 5, the pixels displayed in black are hatched. Examples of the identification figure include an AR marker and an April Tag. Further, where a small identification figure is used, suitable measures, e.g., arranging a lens over the identification figure, may be taken to enable the camera 31, which is described later, to capture an enlarged image of the identification figure.

The material storage 20 is disposed on the left of the first machine tool 10A in FIG. 1. The material storage 20 stores materials (unmachined workpieces W1) to be machined in the first machine tool 10. The product storage 21 is disposed on the right of the third machine tool 10C in FIG. 1. The product storage 21 stores products or semi-finished products (machined workpieces W2) machined in the third machine tool 10C.

As illustrated in FIG. 1, the automatic guided vehicle 35 as an example of the moving unit has a mount surface 36 as its top surface, on which the robot 25 is mounted. Further, the automatic guided vehicle 35 has an operation panel 37 attached thereto, which can be carried around by an operator. The operation panel 37 has an input and output unit for input and output of data, an operation unit for manual operation of the automatic guided vehicle 35 and robot 25, and a display capable of displaying a picture thereon.

Further, the automatic guided vehicle 35 has a sensor (for example, a distance measurement sensor using a laser beam) which enables recognition of the position of the automatic guided vehicle 35 in a plant, and the automatic guided vehicle 35 is configured to travel tracklessly in a horizontal X-axis and Y-axis plane under control by the controller 40 in the plant including the area where the first machine tool 10A, the second machine tool 10B, the third machine tool 10C, the material storage 20, and the product storage 21 are disposed. The robot-mounted mobile device in this embodiment moves to operation positions respectively set with respect to the first machine tool 10A, the second machine tool 10B, the third machine tool 10C, the material storage 20, and the product storage 21.

Figure 3:
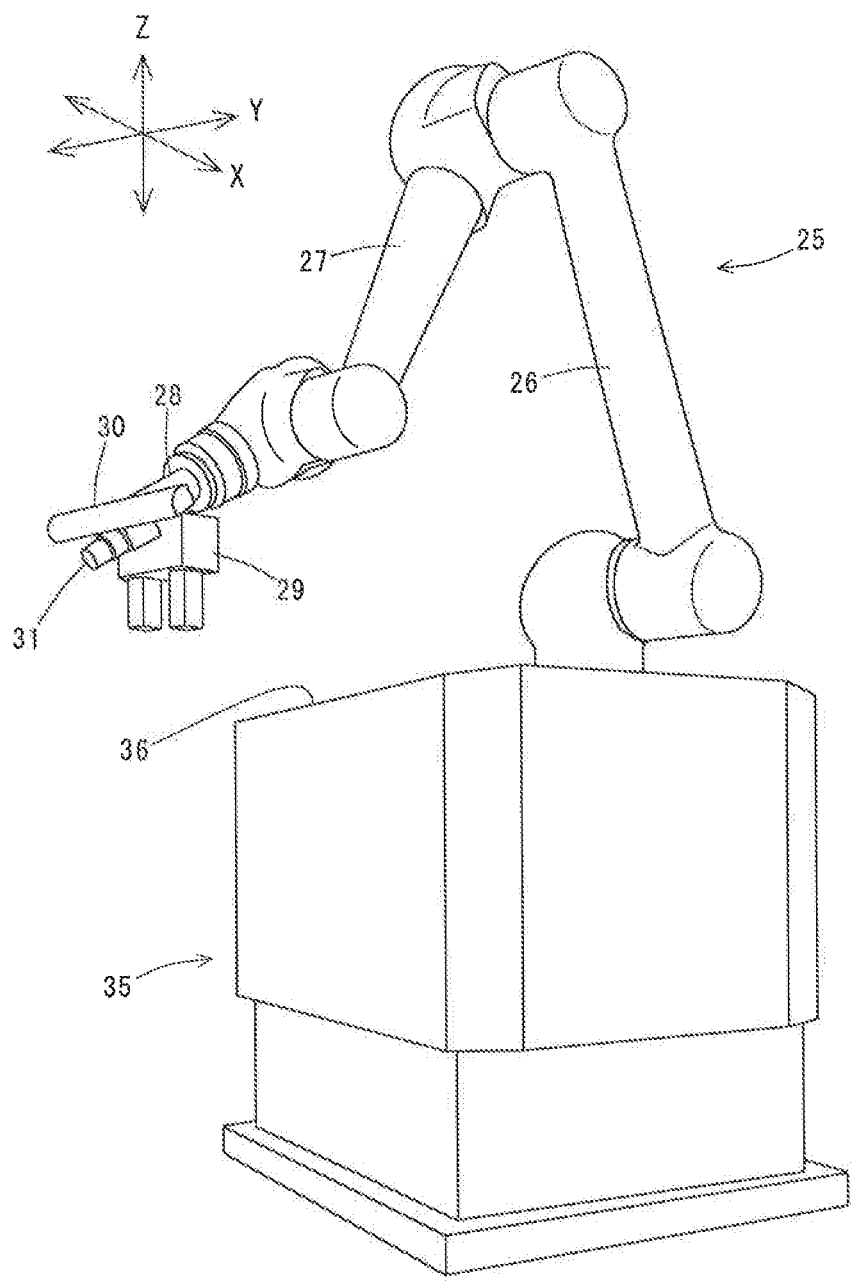
FIG. 3 is a perspective view illustrating a moving unit and a robot according to the embodiment.

As illustrated in FIGS. 1 and 3, the robot 25 in this embodiment is an articulated robot that has three arms, namely, a first arm 26, a second arm 27, and a third arm 28. The robot 25 has a hand 29 as an end effector (acting part) attached to the distal end of the third arm 28 and also has one camera 31 attached to the distal end of the third arm 28 via a support bar 30. The hand 29 and the camera 31 are moved in a three-dimensional space defined by the horizontal X-axis and Y-axis and a vertical Z-axis orthogonal to the X-axis and the Y-axis.

Note that the robot 25 is not limited to the above-described configuration. For example, the robot only needs to have at least (i) a camera, (ii) a hand unit for gripping a target object such as a workpiece or a tool, (iii) a second arm unit to which the hand unit is movably connected, and (iv) a first arm unit to which the second arm unit is movably connected. In this embodiment, the first arm 26, the second arm 27, and the hand 29 respectively correspond to the first arm unit, the second arm unit, and the hand unit. Alternatively, the second arm 27, the third arm 28, and the hand 29 respectively correspond to the first arm unit, the second arm unit, and the hand unit.

As illustrated in FIG. 2, the controller 40 consists of an operation program storage 41, a moving position storage 42, an operating pose storage 43, a map information storage 44, a reference image storage 45, a manual-operation control unit 46, an automatic-operation control unit 47, a map information generator 48, a position recognition unit 49, a compensation amount calculator 50, and an input and output interface 51. The controller 40 in this embodiment is connected to the robot 25, the camera 31, the automatic guided vehicle 35, and the operation panel 37 via the input and output interface 51 so as to cause the manual-operation control unit 46 and the automatic-operation control unit 47 to control the position of the hand 29, operations, such as opening and closing, of the hand 29, operations of the camera 31, operations of the automatic guided vehicle 35.

Note that the controller 40 is composed of a computer including a CPU, a RAM, and a ROM. The manual-operation control unit 46, the automatic-operation control unit 47, the map information generator 48, the position recognition unit 49, the compensation amount calculator 50, and the input and output interface 51 are functional modules that are functionally implemented by a computer program to carry out the processes described later. The operation program storage 41, the moving position storage 42, the operating pose storage 43, the map information storage 44, and the reference image storage 45 are composed of an appropriate storage medium, e.g., a RAM. In this embodiment, the controller 40 is attached to the automatic guided vehicle 35 and is connected to the robot 25, the camera 31, the automatic guided vehicle 35, and the operation panel 37 by wire or wirelessly. However, the controller 40 is not limited to this configuration and may be disposed at an appropriate position other than the automatic guided vehicle 35. For example, the controller 40 may be disposed on an operation panel. In such a case, the controller 40 is connected to the above-mentioned elements through appropriate communication means.

The operation program storage 41 is a functional unit that stores an automatic-operation program for causing the automatic guided vehicle 35 and the robot 25 to automatically operate during production and stores a map generation program for causing the automatic guided vehicle 35 to operate during generation of map information of the plant, which is described later. The automatic-operation program and the map generation program are stored into the operation program storage 41, for example, by being input through the input and output unit of the operation panel 37.

The automatic-operation program contains command codes regarding a moving position as a target position to which the automatic guided vehicle 35 is to be moved, a moving speed of the automatic guided vehicle 35, and an orientation of the automatic guided vehicle 35. The automatic-operation program further contains command codes regarding operations to be carried out in sequence by the robot 25 and command codes regarding operations of the camera 31. The map generation program contains command codes for causing the automatic guided vehicle 35 to travel tracklessly all over the plant to cause the map information generator 48 to generate map information.

The map information storage 44 is a functional unit that stores map information including information on arrangement of machines, devices, instruments, etc. (hereinafter, collectively referred to as "devices") arranged in the plant where the automatic guided vehicle 35 travels. The map information is generated by the map information generator 48.

The map information generator 48 obtains spatial information of the plant from distance data detected by the sensor when the automatic guided vehicle 35 is caused to travel in accordance with the map generation program stored in the operation program storage 41 under control by the automatic-operation control unit 47, which is described in detail later, of the controller 40. The map information generator 48 also recognizes planar shapes of the devices arranged in the plant, and, for example, based on previously registered planar shapes of the devices, recognizes the positions, planar shapes, etc. of particular devices (in this example, the first machine tool 10A, the second machine tool 10B, the third machine tool 10C, the material storage 20, and the product storage 21) arranged in the plant (arrangement information). The map information generator 48 stores the obtained spatial information and arrangement information as map information of the plant into the map information storage 44.

The moving position storage 42 is a functional unit that stores specific moving positions. The moving positions are specific target positions to which the automatic guided vehicle 35 is to be moved, and correspond to the command codes contained in the operation program. The moving positions include the above-mentioned operation positions set with respect to the first machine tool 10A, the second machine tool 10B, the third machine tool 10C, the material storage 20, and the product storage 21. The operation positions in this embodiment correspond to the first device position and second device position of the moving unit of the robot-mounted mobile device, i.e., the automatic guided vehicle 35. Note that each target moving position as a moving position in this embodiment is set, for example, as follows: the automatic guided vehicle 35 is manually operated through the operation panel 37 so that it is moved to each targeted position under control by the manual-operation control unit 46, and position data recognized by the position recognition unit 49 at each targeted position is stored into the moving position storage 42. This operation is generally called "teaching operation".

The operating pose storage 43 is a functional module that stores data regarding poses (operating poses) of the robot 25, into which the robot 25 is brought in sequence when it is operated in a predetermined sequence. The operating poses correspond to the command codes contained in the operation program. This operating pose data stored in the operating pose storage 43 is obtained by, in the teaching operation using the operation panel 37, manually operating the robot 25 to bring the robot 25 into each targeted pose under control by the manual-operation control unit 46. In this embodiment, rotational angle data of joints (motors) of the robot 25 in each targeted pose is stored as the operating pose data in the operating pose storage 43.

However, the present invention is not limited to such data. For example, a configuration is possible in which an image of the identification figure is captured by the camera in each pose and a table in which an identification position (for example, a coordinate in two axes) of the identification figure in the captured image data and the pose of the robot are associated with each other is stored into the moving position storage 43. In this configuration, it is necessary to generate the table such that the identification position is associated also with a device position. For example, a first device position and a first identification position are associated with an unfolded robot pose with the first arm unit and the second arm unit forming an angle of 60°. The first device position and a second identification position (different from the first identification position) are associated with a folded robot pose with the first arm unit and the second arm unit forming an angle of 10°. Further, instead of generating such a table, a computing unit may be provided that carries out a computing process using a transformation matrix capable of transformation corresponding to the above-described association. That is to say, a configuration is possible in which the position (a two-dimensional coordinate, a three-dimensional coordinate, or the like) of the hand unit of the robot is computed based on the coordinate of the identification figure.

Specific operating poses of the robot 25 in this embodiment are set with respect to each of the material storage 20, first machine tool 10A, second machine tool 10B, third machine tool 10C, and product storage 21. For example, a set of extraction poses (target operating poses) is set with respect to the material storage 20. The set of extraction poses consists of an operation starting pose for starting an operation with respect to the material storage 20 (extraction starting pose), operating poses for causing the hand 29 to grip an unmachined workpiece W stored in the material storage 20 and extract the unmachined workpiece W from the material storage 20 (extracting poses), and a pose for finishing the extraction (extraction finishing pose; in this embodiment, this pose is identical to the extraction starting pose).

A set of poses in a workpiece removal operation (set of workpiece-removal poses) for removing a machined workpiece W2 from the machine tool 10 and a set of poses in a workpiece attachment operation (set of workpiece-attachment poses) for attaching an unmachined workpiece W1 to the machine tool 10 are set as target operating poses with respect to the machine tool 10.

The set of workpiece-removal poses consists of, for example, the following poses in sequence: an operation starting pose preceding insertion into the machine tool 10; a pose for moving the hand 29 into the machining area of the machine tool 10 and causing the camera 31 to capture an image of the identification figure arranged in the machine tool (image capturing pose; see FIG. 4); a pose for positioning the hand 29 opposite a machined workpiece W2 clamped by the chuck 12 of the machine tool 10 (removal preparing pose); a pose for moving the hand 29 toward the chuck 12 and causing the hand 29 to grip the machined workpiece W2 clamped by the chuck 12 (gripping pose); a pose for moving the hand 29 away from the chuck 12 to pull the machined workpiece W2 from the chuck 12 (pulling pose); and a pose for moving the hand 29 and the camera 31 out of the machine tool 10 (operation finishing pose). These poses are each set as a target operating pose in this embodiment. In this embodiment, the camera 31 as positioned opposite the identification figure is preferably in a pose such that an optical axis of the camera 31 is perpendicular to the plane including the identification figure.

Although the image capturing pose in this embodiment moves the hand 29 and the camera 31 into the machine tool, the image capturing pose is not limited to such a pose. For example, as illustrated in FIG. 1, the hand 29 and the camera 31 may be positioned outside the machine tool 10. In this case, the position of the camera 31 of the robot 25 can be adjusted by rotation or movement so that the camera 31 can capture an image of the identification figure arranged inside the machine tool 10, in other words, so that the camera 31 faces the identification figure, that is to say, so that the optical axis of the camera 31 intersects (preferably, becomes perpendicular to) the plane including the identification figure. Further, the image capturing pose may be a pose obtained by changing the orientation of the camera 31 in the operation starting pose in this embodiment so that the camera 31 faces the identification figure.

The set of workpiece-attachment poses consists of, for example, the following poses in sequence: an operation starting pose preceding insertion into the machine tool 10; a pose for moving the hand 29 and the camera 31 into the machining area of the machine tool 10, positioning the camera 31 opposite the identification figure arranged on the support bar 15, and causing the camera 31 to capture an image of the identification figure (image capturing pose; see FIG. 4); a pose for positioning a unmachined workpiece W1 gripped by the hand 29 opposite the chuck 12 of the machine tool (attachment preparing pose); a pose for moving the hand 29 toward the chuck 12 to allow the chuck 12 to clamp the unmachined workpiece W1 (attaching pose); a pose for moving the hand 29 away from the chuck 12 (moving-away pose); and a pose for moving the hand 29 and the camera 31 out of the machine tool 10 (operation finishing pose). These poses are each set as a target operating pose in this embodiment.

Although the image capturing pose in this embodiment moves the hand 29 and the camera 31 into the machine tool 10, the image capturing pose is not limited to such a pose. For example, as illustrated in FIG. 1, the identification figure arranged on the display board 16 inside the machine tool may be imaged with the hand 29 and the camera 31 positioned outside the machine tool 10. In this case, the position of the camera 31 of the robot 25 can be adjusted by rotation or movement so that the camera 31 can capture an image of the identification figure arranged inside the machine tool 10, in other words, so that the camera 31 faces the identification figure, that is to say, so that the optical axis of the camera 31 intersects (preferably, becomes perpendicular to) the plane including the identification figure. Further, the image capturing pose may be a pose obtained by changing the orientation of the camera 31 in the operation starting pose in this embodiment so that the camera 31 faces the identification figure.

The following poses are poses of the robot 25 set with respect to the product storage 21: an operation starting pose for starting an operation with respect to the product storage 21 (storage starting pose); operating poses for storing a machined workpiece W2 gripped by the hand 29 into the product storage 21 (storing poses); and a pose for finishing the storage (storage finishing pose; in this embodiment, this pose is identical to the storage starting pose). In this embodiment, these poses are set as a set of storage poses (target operating poses).

The position recognition unit 49 is a functional module that recognizes the position of the automatic guided vehicle 35 in the plant based on distance data detected by the sensor and the map information of the plant stored in the map information storage 44 and recognizes the position of the hand 29 as an end effector and the position of the camera 31 in the three-dimensional space based on rotational angles of the motors arranged on the joints of the robot 25. Based on the position of the automatic guided vehicle 35 recognized by the position recognition unit 49, the automatic-operation control unit 47 controls operation of the automatic guided vehicle 35. The positions recognized by the position recognition unit 49, i.e., the recognized position in the X-axis and Y-axis plane of the automatic guided vehicle 35 and the recognized positions in the three-dimensional space (defined by the X-axis, the Y-axis, and the Z-axis) of the hand 29 and camera 31, are displayed on the display of the operation panel 37. Note that the positions in the three-dimensional space of the hand 29 and camera 31 can be calculated by a predetermined transformation based on the lengths of the arms of the robot 25 and the rotational angles of the motors arranged on the joints of the robot 25.

The manual-operation control unit 46 is a functional module that operates the automatic guided vehicle 35, the robot 25, and the camera 31 in accordance with operation signals input through the operation panel 37 by an operator.

That is to say, under control by the manual-operation control unit 46, an operator can translate the automatic guided vehicle 35 along the X-axis and the Y-axis and capture an image with the camera 31 through the operation panel 37 while checking the position of the automatic guided vehicle 35 and the positions in the three-dimensional space of the hand 29 and camera 31 that are recognized by the position recognition unit 49 and displayed on the display. The operator also can translate the hand 29 and camera 31 of the robot 25 along the X-axis, the Y-axis, and the Z-axis and rotate the hand 29 and camera 31 of the robot 25 about the X-axis, the Y-axis, and the Z-axis. Note that the rotations about the X-axis, the Y-axis, and the Z-axis are represented by rx, ry, and rz, respectively.

The automatic-operation control unit 47 is a functional module that operates the automatic guided vehicle 35, the robot 25, and the camera 31 in accordance with the automatic-operation program or map generation program stored in the operation program storage 41. In this process, the data stored in the moving position storage 42 and the operating pose storage 43 are used as necessary.

Figure 15:
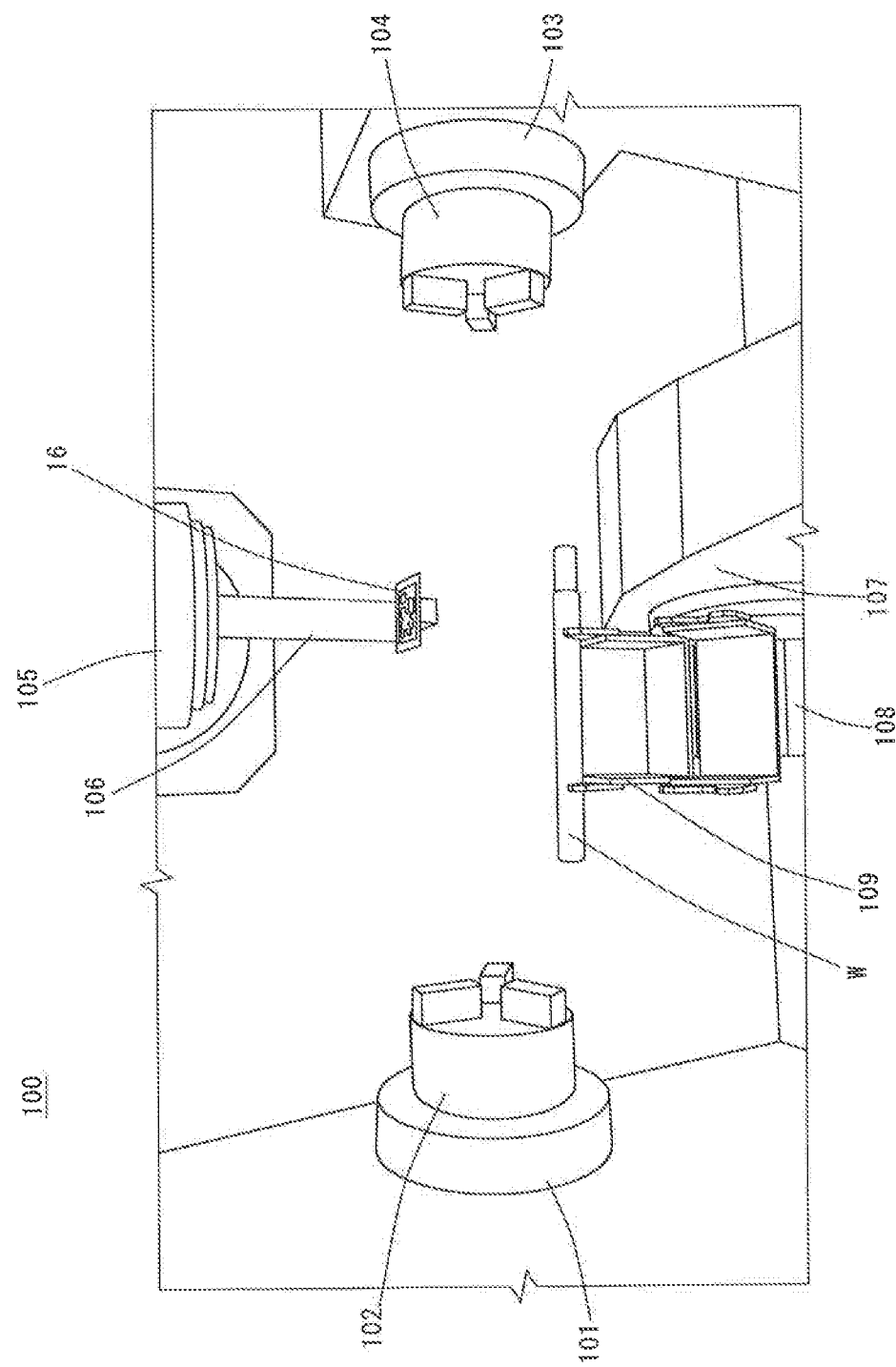
FIG. 15 is an illustrative diagram illustrating a modification in which the identification figure is arranged inside a machine tool.

The reference image storage 45 is a functional module that stores, as a reference image, an image obtained by, in the teaching operation, causing the camera 31 to capture an image of the identification figure (FIG. 4) arranged on the support bar 15 of the tool presetter 13 when the automatic guided vehicle 35 is positioned at the operation position set with respect to the machine tool 10 and the robot 25 is in the image capturing pose. Note that the identification figure is not limited to being arranged on the tool presetter as illustrated in FIG. 4. As illustrated in FIG. 15, the identification figure may be an identification figure attached to an instrument attachable to and detachable from a tool spindle.

For example, in the case of a horizontal lathe 100 as illustrated in FIG. 15 that has a tool spindle 105 rotating a tool, the lathe 100 can be configured such that the display board 16 is supported horizontally by a holder 106 and the holder 106 is to be attached to the tool spindle 105. In this case, the holder 106 is stored in a tool magazine as a tool storage while machining is being performed by the lathe 100, and the holder 106 is extracted from the tool magazine and attached to the tool spindle 105 when the robot 25 performs an operation. Note that, in FIG. 15, reference numeral 101 denotes a first spindle, reference numeral 103 denotes a second spindle, and these spindles are arranged to be coaxial with each other and face each other. Further, reference numeral 102 denotes a first chuck attached to the first spindle 101 and reference numeral 104 denotes a second chuck attached to the second spindle 103. Further, reference numeral 107 denotes a tool rest, reference numeral 108 denotes a turret mounted on the tool rest 107, and reference numeral 109 denotes a support jig attached to an outer surface of the turret 108 to support a workpiece W.

Figure 12:
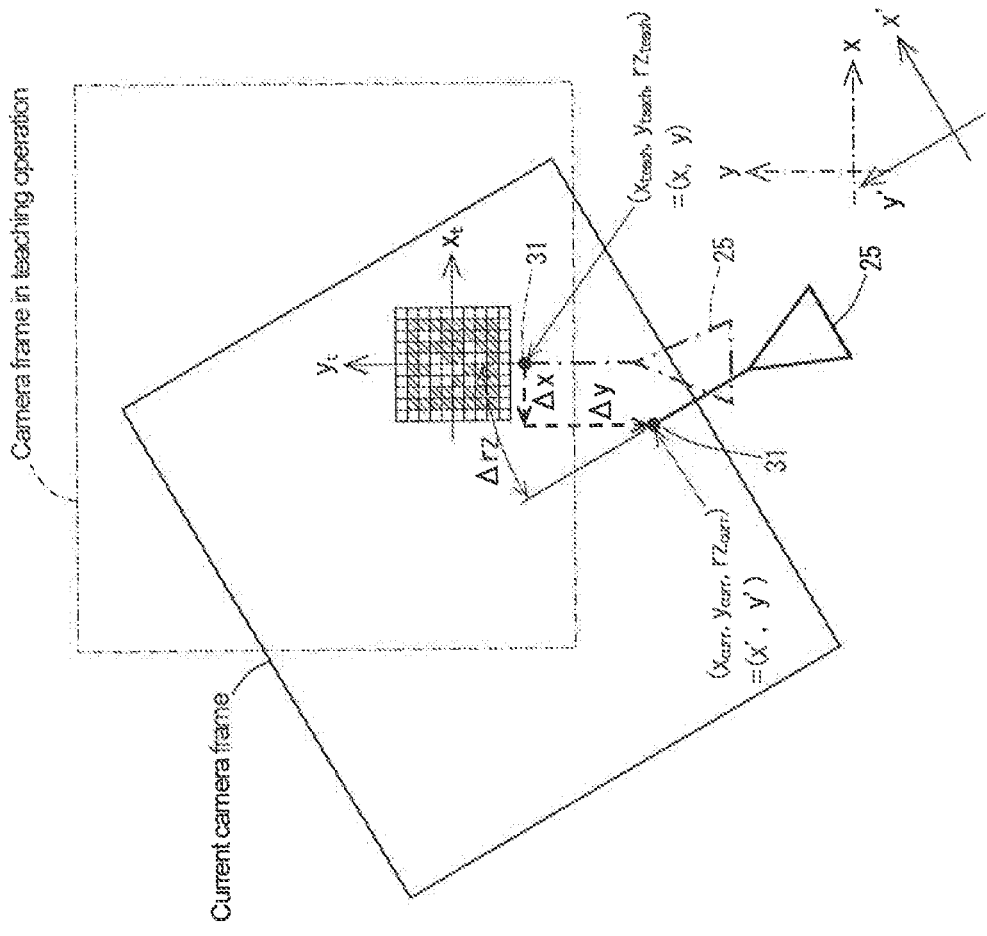
FIG. 12 is an illustrative diagram for explaining a method of calculating a compensation amount in the embodiment.

When the robot 25 is automatically operating in accordance with the automatic-operation program stored in the operation program storage 41 under control by the automatic-operation control unit 47 to carry out the workpiece removal operation or the workpiece attachment operation, once an image of the identification figure is captured by the camera 31 with the robot 25 in the image capturing pose, the compensation amount calculator 50 estimates, based on the current image of the identification figure captured in this automatic operation and the reference image (image captured in the teaching operation) stored in the reference image storage 45, positional error amounts ($\Delta x$, $\Delta y$) of the camera 31 in two orthogonal axis directions set in a plane parallel to the identification figure (in this embodiment, the X-axis direction and the Y-axis direction) and a rotational error amount (Δrz) of the camera 31 about a vertical axis orthogonal to the plane (in this embodiment, the Z-axis) between the current pose (actual operating pose) of the robot 25 and the pose (target operating pose) of the robot 25 in the teaching operation. Based on the estimated error amounts, the compensation amount calculator 50 calculates compensation amounts for the acting part (corresponding to the hand 29 or the camera 31) in the actual operating pose of the robot 25 (see FIG. 12). Note that the positional error amounts (Δx, Δy) and the rotational error amount (Δrz) are caused by a positioning error of the automatic guided vehicle 35 with respect to the target operation position set in the teaching operation. The positional error amounts (Δx, Δy) and the rotational error amount (Δrz) are substantially equivalent to positioning error amounts as differences between the target operation position and the position at which the automatic guided vehicle 35 is actually stopped.

The compensation amounts calculated by the compensation amount calculator 50 are used to compensate the operating poses of the robot 25 for performing the operation with respect to the machine tool 10, i.e., the removal preparing pose, gripping pose, and pulling pose of the set of workpiece-removal poses or the attachment preparing pose, attaching pose, and moving-away pose of the set of workpiece-attachment poses, so that the position (target position) of the hand 29 of the robot 25 in each pose is compensated based on the compensation amounts by the automatic-operation control unit 47. Note that the compensation amounts are transformed into angle data for the joints of the robot 25 by a preset transformation by the automatic-operation control unit 47, so that the robot 25 is controlled in accordance with the angle data.

Figure 6:
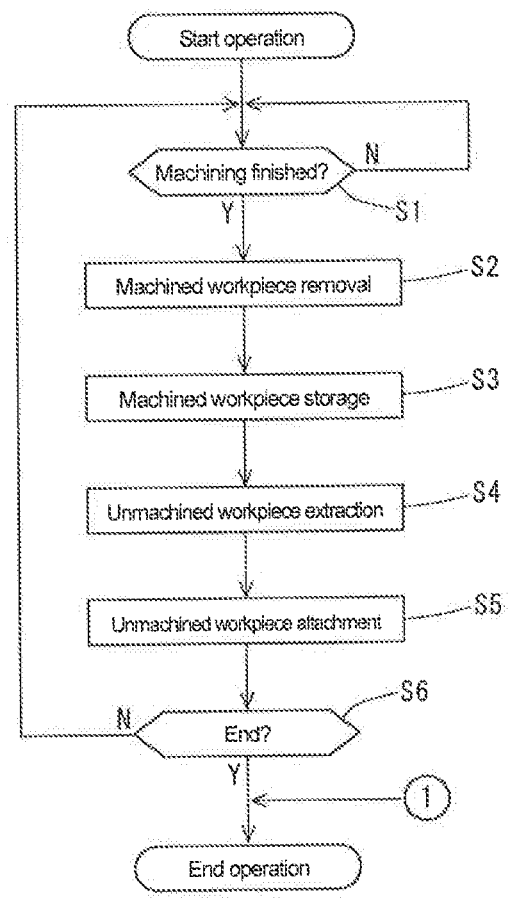
FIG. 6 is an illustrative diagram regarding control of a robot-mounted mobile device according to the embodiment.

In the system 1 according to this embodiment having the above-described configuration, the automatic-operation control unit 47 of the controller 40 executes the automatic-operation program stored in the operation program storage 41. In this process, the automatic-operation control unit 47 controls the automatic guided vehicle 35 and the robot 25 to cause them to perform the operations shown in FIG. 6 with respect to the machine tool 10, the material storage 20, and the product storage 21.

Specifically, the automatic-operation control unit 47 waits until receiving from the machine tool 10 a signal notifying completion of a machining operation (step S1). Note that, once a machining operation is completed in the machine tool 10, a door cover of the machine tool 10 is opened so that the robot 25 can enter the machining area, and the support bar 15 of the tool presetter 13 is moved into the machining area. Thereafter, the machining completion signal is transmitted to the machine tool 10.

Figure 7:
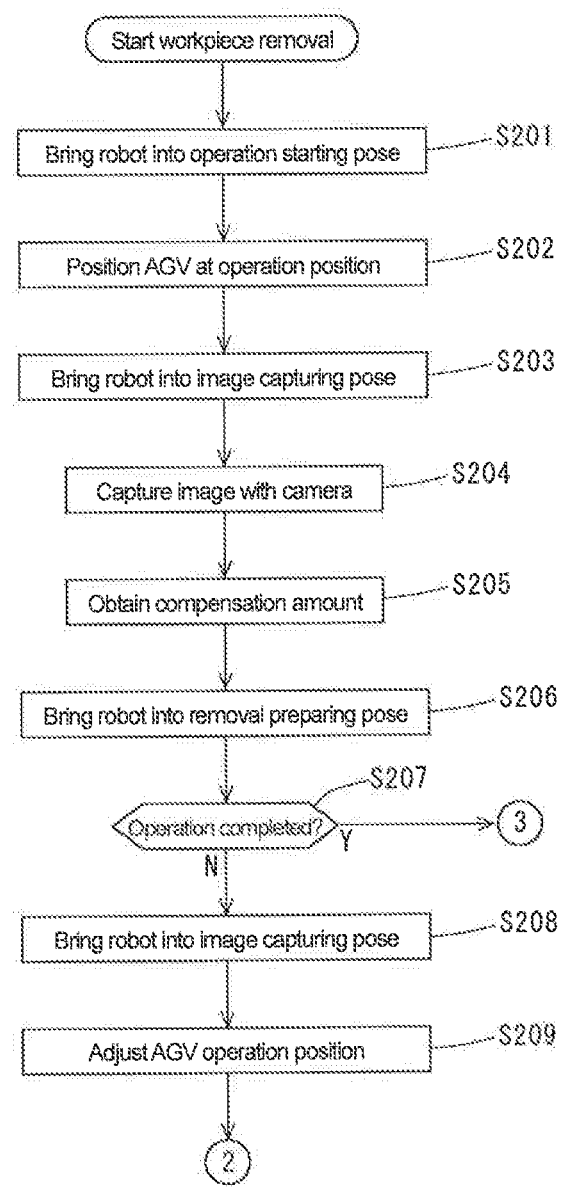
FIG. 7 is an illustrative diagram regarding the control of the robot-mounted mobile device according to the embodiment.
Figure 8:
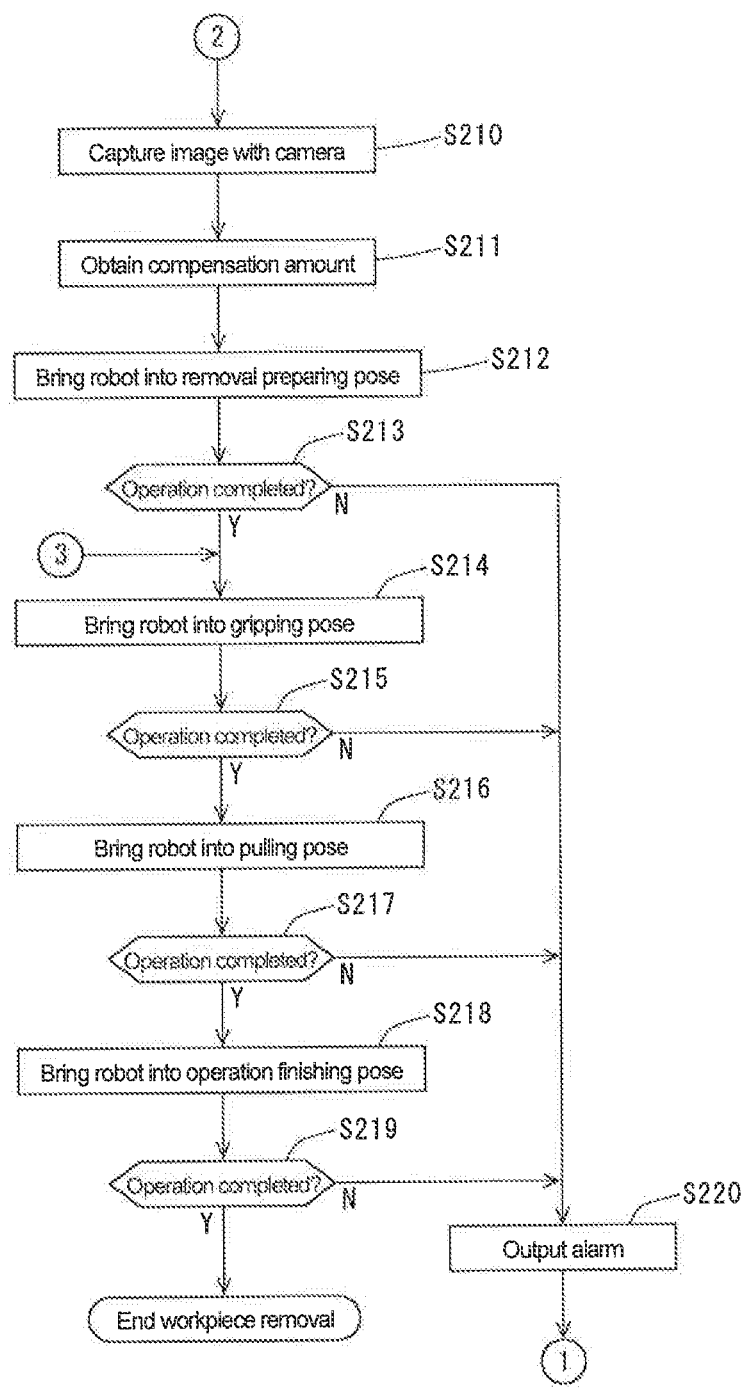
FIG. 8 is an illustrative diagram regarding the control of the robot-mounted mobile device according to the embodiment.

Subsequently, the automatic-operation control unit 47 carries out the operation shown in FIGS. 7 and 8 to remove the machined workpiece W2 (step S2). That is to say, the automatic-operation control unit 47 brings the robot 25 into the operation starting pose (step S201), and then positions the automatic guided vehicle 35 at the operation position set with respect to the machine tool 10 (step S202).

Subsequently, the automatic-operation control unit 47 brings the robot 25 into the image capturing pose (step S203), and then causes the camera 31 to capture an image of the identification figure arranged on the support bar 15 (step S204). Once the camera 31 captures the image of the identification figure, the compensation amount calculator 50 estimates positional error amounts Δx, Δy and a rotational error mount Δrz between the current image capturing pose of the robot 25 and the image capturing pose of the robot 25 in the teaching operation based on the captured image including the identification figure and the reference image including the identification figure and stored in the reference image storage 45. Based on the estimated error amounts, the compensation amount calculator 50 calculates compensation amounts in the X-axis direction, the Y-axis direction, and the rz direction for the subsequent operating poses of the set of workpiece-removal poses of the robot 25.

The automatic-operation control unit 47 obtains the calculated compensation amounts from the compensation amount calculator 50 (step S205), and then brings the robot 25 into the removal preparing pose compensated based on the obtained compensation amounts in the X-axis direction, the Y-axis direction, and the rz direction (step S206). Thereafter, the automatic-operation control unit 47 monitors whether the operation is completed (step S207). If the operating pose of the robot 25 is compensated with the positioning error amount of the automatic guided vehicle 35 positioned at the operation position exceeding the movable range of the acting part (here, the hand 29) that is limited by the singularities, the robot 25 fails to complete the operation, which results in the robot 25 being stopped. Accordingly, in this embodiment, the automatic-operation control unit 47 monitors whether the robot 25 completes the operation (step S207), and brings the robot 25 into the next operating pose, i.e., the gripping pose, after the robot 25 completes the operation (step S214). If the robot 25 fails to complete the operation within a predetermined period of time, the automatic-operation control unit 47 performs a recovery operation in steps S208 to S213.

In the recovery operation, the automatic-operation control unit 47 first brings the stopped robot 25 into the previous operating pose, i.e., the image capturing pose (step S208). Thereafter, the automatic-operation control unit 47 moves the automatic guided vehicle 35 by the positioning error amount Δx, Δy to the side opposite to the position deviation in each of the X-axis direction and Y-axis direction, thereby adjusting the operation position (step S209).

For example, in FIG. 1, the automatic guided vehicle 35 (robot-mounted mobile device) is moved at a first speed SP1 and stopped in front of the second machine tool 10B. Thereafter, an image of the identification figure is captured with the robot 25 in the image capturing pose, and the compensation is carried out based on the captured image. As a result, if it is determined that there is the need to carry out the recovery operation, the automatic guided vehicle 35 is moved by the calculated positioning error amount Δx at a second speed SP2 slower than the first speed S1. FIG. 1 shows an example case where the positioning error amount Δy is zero. By being moved by the positioning error amount Δx, the automatic guided vehicle 35 is moved to the position identical to the taught position. Thereby, the position deviation of the actual operating position of the automatic guided vehicle 35 with respect to the target operation position set in the teaching operation is eliminated, so that the automatic guided vehicle 35 is positioned almost at the target operation position. Note that the moving speed of the automatic guided vehicle 35 in adjusting the position of the automatic guided vehicle 35 may be equal to the moving speed of the automatic guided vehicle 35 in positioning the automatic guided vehicle 35 at the target operation position in the automatic operation. However, it is preferred that, as described above, the moving speed in the position adjustment is slower than that in the positioning. Moving the automatic guided vehicle 35 at such a slower speed enables the position of the automatic guided vehicle 35 to be adjusted exactly, i.e., with high accuracy. Consequently, the accuracy of the position of the robot is improved.

Subsequently, the automatic-operation control unit 47 causes the camera 31 to capture a new image of the identification figure (step S210). Thereafter, the automatic-operation control unit 47 obtains from the compensation amount calculator 50 new compensation amounts calculated based on the captured new image of the identification figure (step S211), and brings the robot 25 into the removal preparing pose compensated based on the obtained new compensation amounts in the X-axis direction, the Y-axis direction, and the rz direction (step S212). Thereafter, the automatic-operation control unit 47 monitors whether the operation is completed (step S213). When the operation is completed, the automatic-operation control unit 47 performs the operation in step S214. When the operation is not completed, since the singularity issue has probably been solved by the above-described recovery operation, it is conceivable that the operation cannot be not completed due to other causes. Therefore, the automatic-operation control unit 47 outputs an alarm (step S220) and ends the procedure (step S6).

In the step S214, the automatic-operation control unit 47 brings the robot 25 into the gripping pose. After this operation is completed (step S215), the automatic-operation control unit 47 brings the robot 25 into the pulling pose (step S216). After this operation is completed (step S217), the automatic-operation control unit 47 brings the robot 25 into the operating finishing pose. After this operation is completed (step S219), the automatic-operation control unit 47 ends this workpiece removal operation procedure. Note that, while the robot 25 is being brought into the pulling pose from the gripping pose, a chuck open command is transmitted from the automatic-operation control unit 47 to the machine tool 10 so that the chuck 12 is opened.

Note that, if the transition to the gripping pose, the transition to the pulling pose, or the transition to the operation finishing pose is not completed within a predetermined period of time, similarly to the above, the automatic-operation control unit 47 outputs an alarm (step S220) and ends the procedure (step S6).

Thus, the removal of the machined workpiece W2 is carried out.

Subsequently, the automatic-operation control unit 47 carries out the operation of storing the machined workpiece W2 (step S3). In this storing operation, the automatic-operation control unit 47 moves the automatic guided vehicle 35 to the operation position set with respect to the product storage 21 and brings the robot 25 in sequence into the storage starting pose for starting an operation with respect to the product storage 21, the storing poses for storing the machined workpiece gripped by the hand 29 into the product storage 21, and the storage finishing pose for finishing the storage, whereby the machined workpiece gripped by the hand 29 is stored into the product storage 21.

Subsequently, the automatic-operation control unit 47 carries out the operation of extracting an unmachined workpiece W1 as a material (step S4). In this extracting operation, the automatic-operation control unit 47 moves the automatic guided vehicle 35 to the operation position set with respect to the material storage 20 and brings the robot 25 in sequence into the extraction starting pose for starting an operation with respect to the material storage 20, the extracting poses for causing the hand 29 to grip an unmachined workpiece W1 stored in the material storage 20 and extract the unmachined workpiece W1 from the material storage 20, and the extraction finishing pose for finishing the extraction, whereby an unmachined workpiece W is gripped by the hand 29.

Subsequently, the automatic-operation control unit 47 carries out the operation of attaching the unmachined workpiece W1 (step S5). This attaching operation is similar to the operation shown in FIGS. 7 and 8. The removal preparing pose, gripping pose, and pulling pose in the removing operation shown in FIGS. 7 and 8 are replaced by the attachment preparing pose, attaching pose, and moving-away pose in the attaching operation, respectively. Although detailed description of the attaching operation is omitted here, the unmachined workpiece W1 gripped by the hand 29 is transferred to and clamped by the chuck 12 of the machine tool 10 through the attaching operation. Note that, in this attaching operation, a chuck close command is transmitted from the automatic-operation control unit 47 to the machine tool 10 after the robot 25 is brought into the attaching pose. Upon receipt of this chuck close command, the machine tool 10 closes the chuck 12. Thereby, the unmachined workpiece W1 is clamped by the chuck 12.

After completion of his attaching operation, the automatic-operation control unit 47 transmits a machining start command to the machine tool 10 to cause the machine tool 10 to perform a machining operation.

By repeating the above-described procedure, the system 1 according to this embodiment continuously performs unmanned and automated production (step S6). Note that, in this embodiment, the automatic guided vehicle 35 is moved to each operation position at a third speed SP3 faster than the second speed SP2.

In the system 1 according to this embodiment, as described above, even if the robot 25 is stopped because the positioning error amounts of the automatic guided vehicle 35 positioned at the operation position set with respect to the machine tool 10 exceed the movable range of the hand 29 of the robot 25 that is limited by the singularities, the robot 25 is automatically recovered from the stopped state and each of the operating poses, namely, the removing preparing pose, gripping pose, and pulling pose in the removal operation and the attachment preparing pose, attaching pose, and moving-away pose in the attaching operation, of the robot 25 (in other words, the position of the hand 29 in each operating pose) is compensated appropriately. That is to say, the accuracy of the position of the robot is improved. This enables avoidance of burdensome operations, such as manually recovering the system 1 and re-performing the teaching operation, when the robot 25 is stopped, which improves the availability of the system 1.

Further, after the recovery operation, the positioning error amounts of the automatic guided vehicle 35 positioned at the target operation position is re-detected and the removal preparing pose, gripping pose, and pulling pose in the removing operation and the attachment preparing pose, attaching pose, and moving-away pose in the attaching operation, of the robot 25 are compensated based on the re-detected positioning error amounts. Therefore, it is possible to control the operating poses with high accuracy, in other words, it is possible to position the hand 29 of the robot 25 at a targeted position exactly, i.e., with high accuracy.

Above has been described an embodiment of the present invention. However, it should be noted that the present invention is not limited to the above-described embodiment and can be implemented in other manners. Further, the above-described system is not described separately from the system according to the embodiment described later and the present invention may be implemented by combining elements from each embodiment.

For example, the system 1 according to the above-described embodiment is configured such that the positioning error amounts of the automatic guided vehicle 35 positioned at the target operation position is re-detected (steps S210 to 211) after the recovery operation. However, the present invention is not limited to this configuration. For example, in some cases, highly accurate positioning is not required for the operating poses of the robot 25 (the positioning of the hand 29). In such a case, the subsequent operations may be performed without re-detecting the positioning error amounts of the automatic guided vehicle 35 positioned at the target operation position after the recovery operation.

Figure 9:
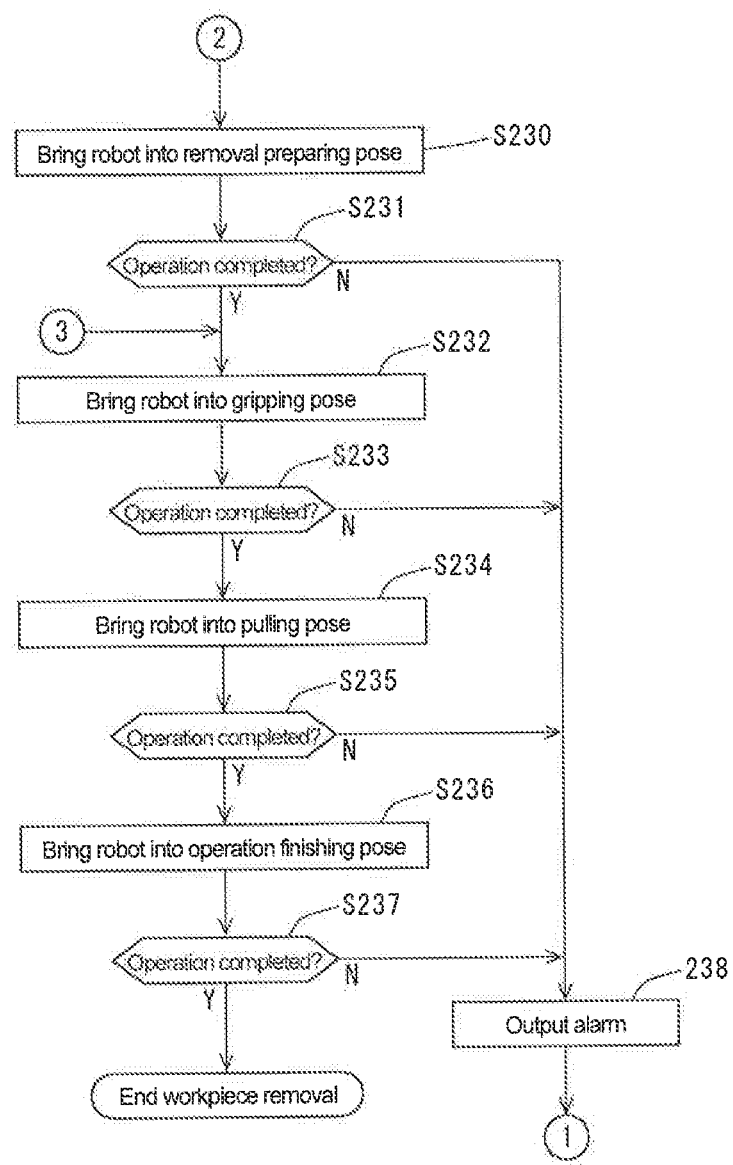
FIG. 9 is an illustrative diagram for explaining the control in the embodiment.
Figure 10:
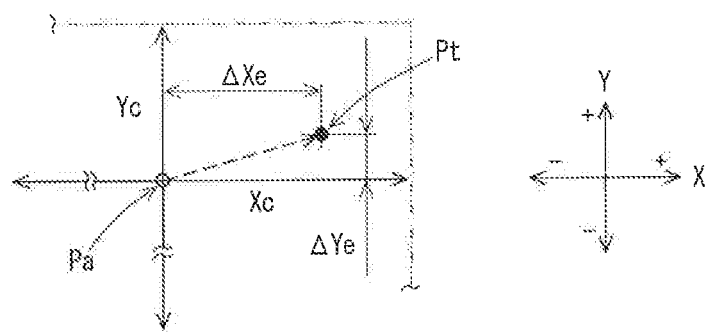
FIG. 10 is an illustrative diagram for explaining a setting method.
Figure 11:
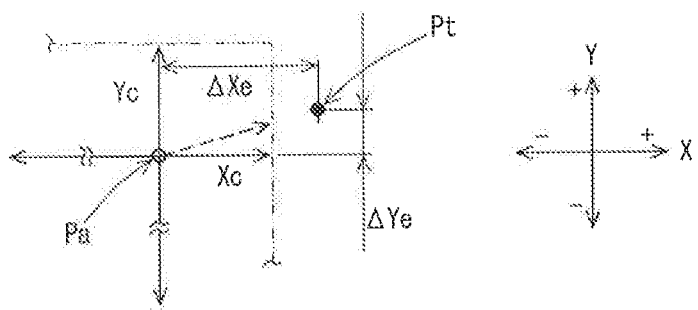
FIG. 11 is an illustrative diagram for explaining the setting method.

An example of this configuration is shown in FIG. 9. The operation shown in FIG. 9 follows the step S209 shown in FIG. 7. After the adjustment of the operation position of the automatic guided vehicle 35, the robot 25 is brought in sequence into the removal preparing pose (attachment preparing pose) (step S232), the gripping pose (attaching pose) (step S234), the pulling pose (moving-away pose) (step S234), and the operation finishing pose (step S236). In this process, compensation in the rotation (rz) direction is performed based on the compensation amount calculated in step S205, while compensation in the X-axis direction and the Y-axis direction is not performed.

Since the operation position has been adjusted by moving the automatic guided vehicle 35 by the positioning error amount Δx, Δy to the side opposite to the position deviation in each of the X-axis direction and Y-axis direction (step S209), the position deviation in the X-axis direction and the Y-axis direction of the automatic guided vehicle 35 with respect to the target operation position set in the teaching operation should be almost eliminated and therefore the automatic guided vehicle 35 should be positioned almost at the target operation position. Therefore, the operating poses of the robot 25 can be adjusted to their respective target operating poses set in the teaching operation by only compensating in the rotation (rz) direction without compensating in the X-axis direction and the Y-axis direction.

Note that, also in the operation shown in FIG. 9, the transition to each operating pose is not completed within a predetermined period of time, similarly to the above, the automatic-operation control unit 47 outputs an alarm (step S238) and ends the procedure (step S6).

Embodiment 2

Figure 14:
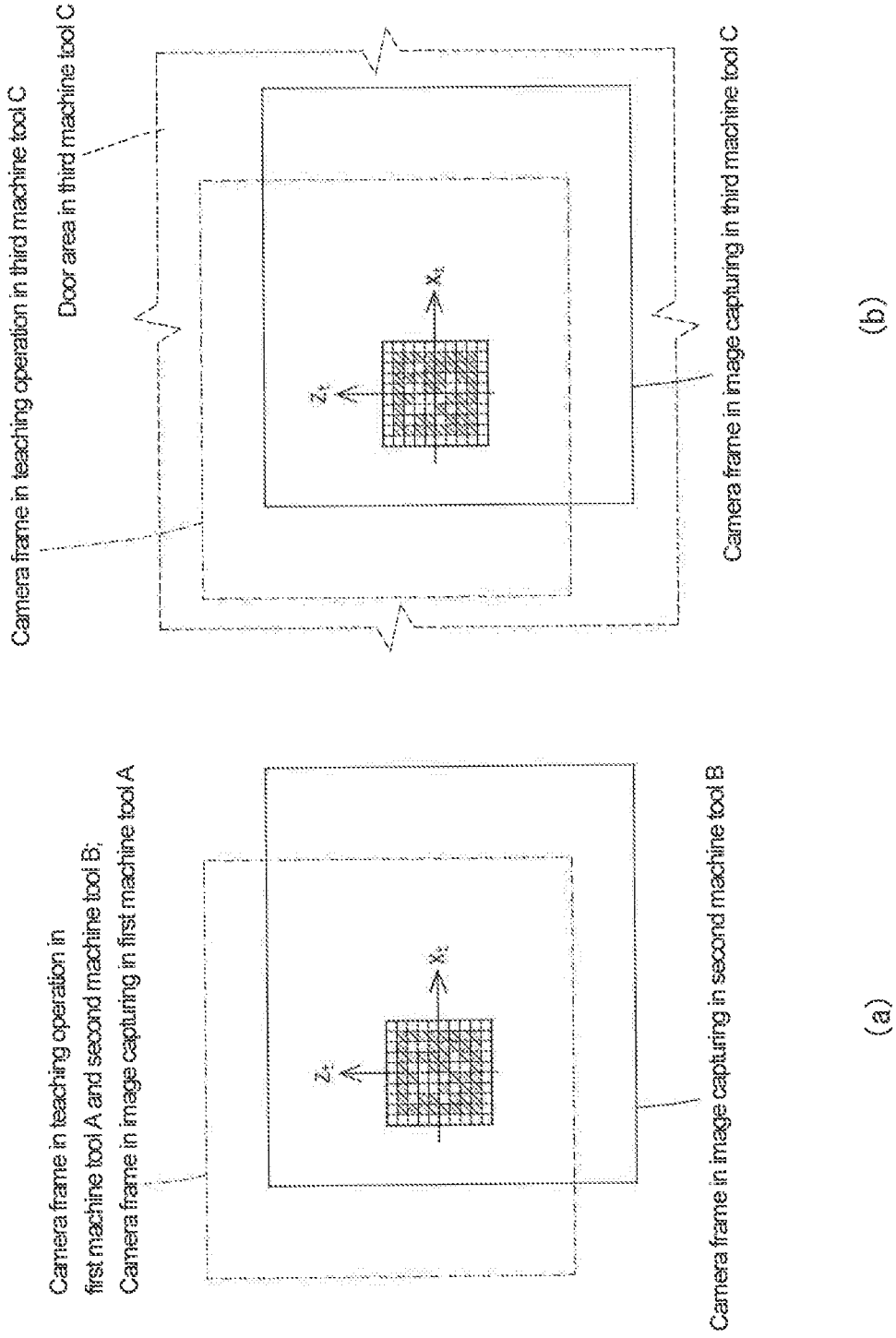
FIG. 14 is a perspective view showing examples of a captured image of the identification figure in the embodiment.

The embodiment 1 describes an example in which the identification figure is arranged parallel to a horizontal plane. This embodiment describes an example in which the identification figure is arranged parallel to a plane intersecting (in particular, perpendicular to) a horizontal plane. FIG. 14 shows a difference in how the identification figure is viewed when an image thereof is captured by the camera 31 with the optical axis of the camera 31 in a horizontal direction. FIG. 14(a) shows images of the identification figure captured in the first machine tool 10A and the second machine tool 10B. FIG. 14(b) shows an image of the identification figure captured in the third machine tool 10C.

Figure 16:
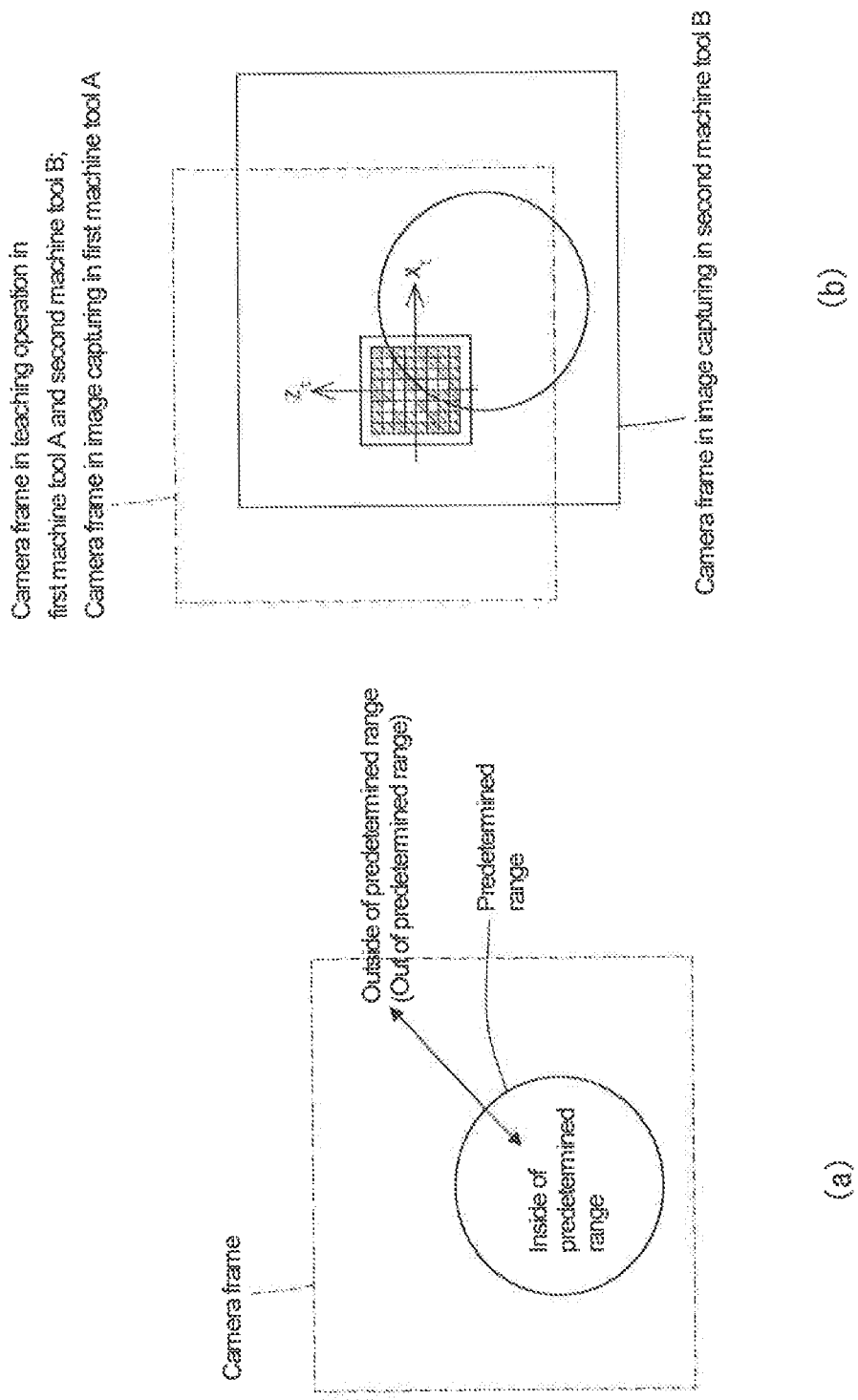
FIG. 16 is an illustrative diagram for explaining a processing performed in a control unit when an image of the identification figure is captured.

FIG. 14(a) shows an example in which an image of the identification figure captured by the camera 31 with the automatic guided vehicle 35 (robot-mounted mobile device) stopped in front of the first machine tool 10A is identical to the image of the identification figure captured in the teaching operation, and also shows an example in which an image of the identification figure captured by the camera 31 with the automatic guided vehicle 35 stopped in front of the second machine tool 10B is different from the image of the identification figure captured in the teaching operation. In these examples, the display board 16 is arranged as illustrated in FIG. 1. These examples show a case where the coordinate position in the x-axis and the z-axis differs while no deviation occurs in the y-axis. The following description based on FIG. 16 relates to the case where an image including the identification figure is captured, wherein how the control unit controls the hand unit of the robot to attach or remove a workpiece or the like and how the control unit determines whether to change the position of the moving unit by moving the robot-mounted mobile device are described. There is an image corresponding to a camera frame as illustrated in FIG. 16(a). An image processing designates a portion of the image as a predetermined range as illustrated in FIG. 16(a). The area inside the predetermined range on the image is designated as the inside of the predetermined range, and the area outside the predetermined range on the image is designated as the outside of the predetermined range. Further, the image processing superimposes information relating to the position of the identification figure on information regarding the image and the predetermined range. In this embodiment, the information relating to the position of the identification figure is the position of the center of the identification figure. The control unit detects the center position of the identification figure in the captured image and determines whether the detected position is situated in the inside of the predetermined range or not. When determining that the center position of the identification figure is situated in the inside of the predetermined range, the control unit controls the hand unit of the robot to carry out an operation such as transportation of a workpiece. On the other hand, when determining that the center position of the identification figure is not situated in the inside of the predetermined range (i.e., situated in the outside of the predetermined range), the control unit moves the moving unit to compensate the position of the robot-mounted mobile device.

When the center of the identification figure is situated in the outside of the predetermined range in the camera frame as a range captured by the camera as shown in FIG. 16(b), the control unit moves the moving unit of the robot-mounted mobile device to change the device position of the robot-mounted mobile device, and then causes the camera to capture an image of the identification figure. When the center of the identification figure is situated in the inside of the predetermined range, the control unit controls the position of the hand unit of the robot of the robot-mounted mobile device to carry out an operation such as attachment or removal of a workpiece. Note that the predetermined range may be a circle having a radius equal to one fourth of the diagonal line of the camera frame. Alternatively, the predetermined range may be the entire area of the camera frame. For example, the control unit may be configured to, always when the center of the identification figure is captured within the camera frame, control the position of the hand unit of the robot to carry out attachment or removal of a workpiece. Thus, the predetermined range can be set appropriately taking into account the movable range of the robot arm.

FIG. 14(b) shows an example of an assumed camera frame in capturing an image of the identification figure with the camera 31 with the automatic guided vehicle 35 stopped in front of the third machine tool 10C. In this example, as shown in FIG. 1, the door 18 of the third machine tool 10C is closed, so that it is impossible to capture an image of the identification figure arranged inside the third machine tool 10C (see FIGS. 1 and 14). In this case, it is preferred that the controller 40 of the robot-mounted mobile device transmits to the third machine tool 10C a command for opening the door 18 or notifies an operator or a supervisor that the door 18 of the third machine tool 10C is closed.

Further, in order to avoid the situation where the robot arm cannot enter the machine tool because of the closed door, a code for opening the door may be inserted in an NC program to be executed in the machine tool. In this case, since the door open code is inserted in the NC program, the robot arm cannot enter the machine tool because of the closed door while the blocks before the door open code of the NC program are being executed. This prevents the robot arm from entering the machine tool while the machine tool is performing an operation such as machining or measurement, which is safe. It is preferred that a setting is made such that, if the automatic guided vehicle arrives at a predetermined position in front of the third machine tool 10C when the door is closed, the automatic guided vehicle waits for a predetermined period of time at the predetermined position. It is preferred that, if the automatic guided vehicle has been waiting longer than the predetermined period of time, this is notified to the operator or the supervisor. In this configuration, since the NC program containing the door open code is executed, the door being automatically opened means that the machine tool is not performing an operation such as machining or measurement. Therefore, the open/closed state of the door can be easily recognized even by remote monitoring; therefore, the supervisor can easily recognize the operational status of the machine tool.

Further, a configuration is also possible in which the automatic guided vehicle 35 transmits a signal to the third machine tool 10C when stopping at the front of the third machine tool 10C. In this case, upon receiving the signal transmitted from the automatic guided vehicle, the third machine tool confirms whether it is now possible to open the door. When confirming that it is now possible to unlock and open the door, the third machine tool opens the door. In this configuration, the door is opened only when necessary and only after safety is confirmed, which enables safe automatic operation.

Figure 13:
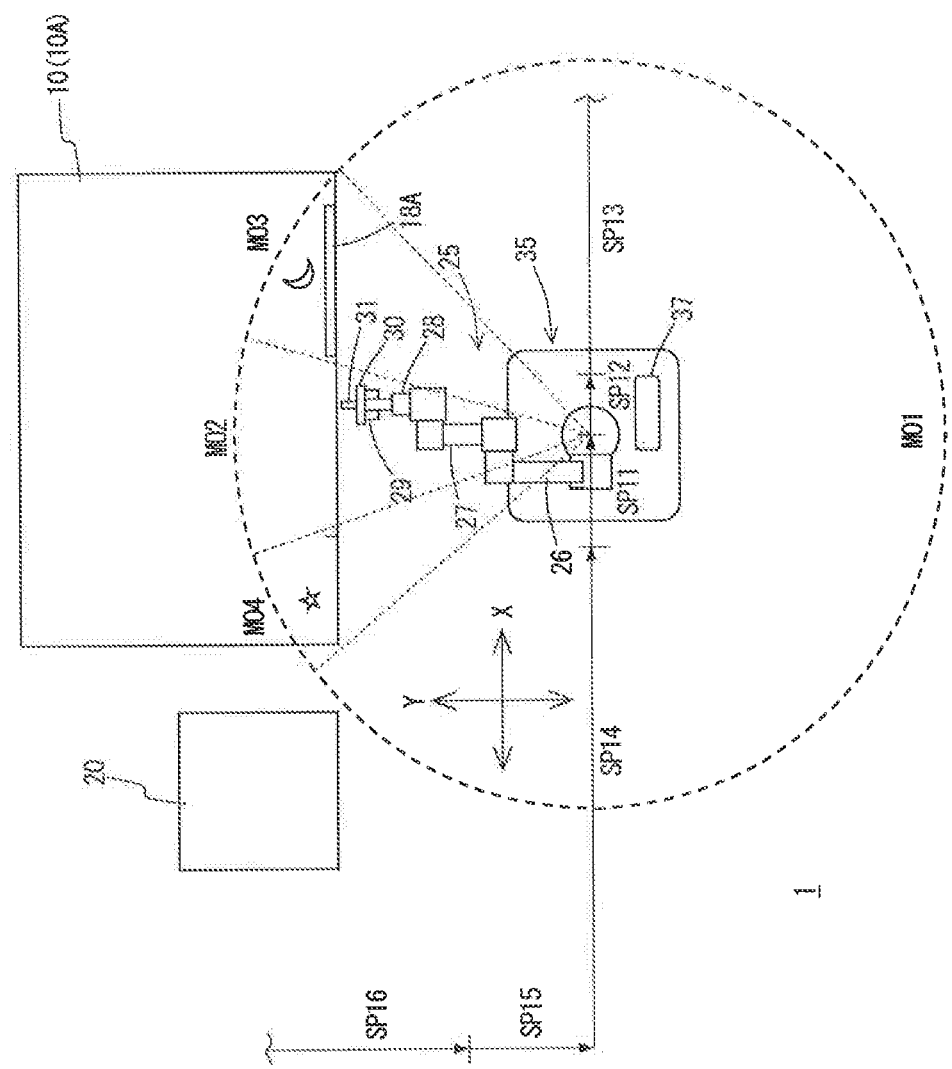
FIG. 13 is a plan view schematically illustrating the structure of the system according to the embodiment.

Further, the automatic guided vehicle 35 as the robot-mounted mobile device in this embodiment may be moved with the moving speeds SP11 to SP16 having the relationship of SP16>SP14>SP13>SP15>SP12>SP11 as shown in FIG. 13. Although the automatic guided vehicle 35 is not limited to these moving speeds, it is preferred that the moving speed SP11 for moving to the stop position for the image capturing pose is so slow as to increase the accuracy of the stop position. For example, the moving speeds SP11 to SP16 may have the relationship of SP14>SP16>SP15>SP13>SP11>SP12. Note that the arrows in FIG. 13 indicate the moving path of the automatic guided vehicle 35.

Further, as shown in FIG. 13, the hand 29 of the robot 25 has the movable range indicated by the broken-line circled area MO1 if there is no obstacle. However, as shown in FIG. 13, the machine tool 10 is situated within the movable range of the hand 29 of the robot 25. Therefore, the hand 29 cannot recognize a workpiece or the like arranged in the area MO3 indicated by the crescent moon mark or the area MO4 indicated by the star mark. In the example shown in FIG. 13, the hand unit of the robot can arrange and remove a target object such as a workpiece in and from the area MO2.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 System
10 Machine tool
11 Spindle
12 Chuck
13 Tool presetter
14 Contactor
15 Support bar
16 Display board
20 Material storage
21 Product storage
25 Robot
29 Hand
31 Camera
35 Automatic guided vehicle
37 Operation panel
40 Controller
41 Operation program storage
42 Moving position storage
43 Operating pose storage
44 Map information storage
45 Reference position storage
46 Manual-operation control unit
47 Automatic-operation control unit
48 Map information generator
49 Position recognition unit
50 Compensation amount calculator
51 Input and output interface
W1 Unmachined workpiece
W2 Machined workpiece

The invention claimed is:

1. A robot-mounted mobile device, comprising:
a robot performing an operation acting on a target object in a machine tool, the machine tool having an openable and closable door and an identification figure arranged in the machine tool, the robot having a hand unit for gripping the target object, a second arm unit to which the hand unit is movably connected, a first arm unit to which the second arm unit is movably connected, and a camera arranged on the hand unit side opposite to the first arm unit;
a control unit controlling a position of the hand unit of the robot; and
a moving unit configured to be movable and having the robot mounted thereon, wherein:
the control unit is configured to detect an open/closed state of the door based on an image captured by the camera;
the control unit is configured to cause the camera to capture a current image of the identification figure when the moving unit is at an operation position and to calculate compensation amounts to move the robot from a current robot position to a robot operation position;
the control unit is configured to
when the compensation amounts are within a predetermined movable range of the hand unit, adjust the position of the hand unit from the current robot position to the robot operation position, and when the compensation amounts are not within the predetermined movable range of the hand unit, adjust the moving unit by moving the moving unit by the compensation amounts.

2. A robot-mounted mobile device including a robot performing an operation acting on a target object in a machine tool, the machine tool having an identification figure arranged in the machine tool, the robot having a hand unit for gripping the target object, a second arm unit to which the hand unit is movably connected, a first arm unit to which the second arm unit is movably connected, and a camera arranged on the hand unit side opposite to the first arm unit;

a control unit controlling a position of the hand unit of the robot; and a moving unit configured to be movable and having the robot mounted thereon, wherein:

the control unit is configured to cause the camera to capture a current image of the identification figure when the moving unit is at an operation position and to calculate compensation amounts to move the robot from a current robot position to a robot operation position;

the control unit is configured to, when the compensation amounts are within a predetermined movable range of the hand unit, adjust the position of the hand unit from the current robot position to the robot operation position, and when the compensation amounts are not within the predetermined movable range of the hand unit, adjust the moving unit by moving the moving unit in a direction opposite to a direction in which the moving unit is moved to a front of the machine tool in order to capture the current image of the identification figure with the camera.

3. The robot-mounted mobile device according to claim 1, wherein a moving speed of the moving unit for moving to the operation position is faster than a moving speed at which the moving unit is moved by the compensation amounts.

4. The robot-mounted mobile device according to claim 1, wherein:

the moving unit is slowed down to a moving speed slower than a moving speed for moving between machine tools, immediately before the moving unit is stopped at the operation position or moved by the compensation amounts; and thereafter, the moving unit is stopped at the operation position or after moving by the compensation amounts.

\* \* \* \* \*